United States Patent
Murakami et al.

(10) Patent No.: US 6,785,545 B1
(45) Date of Patent: Aug. 31, 2004

(54) DIGITAL MOBILE WIRELESS COMMUNICATIONS APPARATUS AND THE SYSTEM USING THE SAME

(75) Inventors: Yutaka Murakami, Kanagawa (JP); Shinichiro Takabayashi, Kanagawa (JP); Masayuki Orihashi, Chiba (JP); Akihiko Matsuoka, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 489 days.

(21) Appl. No.: 09/634,023

(22) Filed: Aug. 8, 2000

(30) Foreign Application Priority Data

Aug. 16, 1999 (JP) ............................................ 11-229685

(51) Int. Cl.[7] .................................................. H04Q 7/20
(52) U.S. Cl. ...................................... 455/441; 655/506
(58) Field of Search ......................... 655/522, 69, 441, 655/67.16, 423, 63.1, 296, 278.1, 114.2, 115.3, 226.1, 226.2, 506; 342/403, 375; 362/357.05; 375/254, 225

(56) References Cited

U.S. PATENT DOCUMENTS

| | | | | |
|---|---|---|---|---|
| 5,386,588 A | * | 1/1995 | Yasuda | 455/423 |
| 5,771,456 A | | 6/1998 | Pon | |
| 5,781,542 A | | 7/1998 | Tanaka et al. | |
| 5,884,178 A | | 3/1999 | Ericsson et al. | |
| 6,104,918 A | * | 8/2000 | Saario et al. | 455/126 |
| 6,377,813 B1 | * | 4/2002 | Kansakoski et al. | 455/522 |
| 6,594,494 B1 | * | 7/2003 | Kakehi | 455/437 |

FOREIGN PATENT DOCUMENTS

| | | |
|---|---|---|
| EP | 899906 | 3/1999 |
| GB | 2305825 | 4/1997 |
| JP | 8-271621 | 10/1996 |
| JP | 8-307924 | 11/1996 |
| JP | 9-46290 | 2/1997 |
| JP | 9-98465 | 4/1997 |
| JP | 10-145309 | 5/1998 |

* cited by examiner

Primary Examiner—Nay Maung
Assistant Examiner—Tu Nguyen
(74) Attorney, Agent, or Firm—RatnerPrestia (57) ABSTRACT

A digital-mobile-wireless-communications apparatus and the system using the same evaluate a transmission environment of transmission paths. The communications apparatus calculates not only a Doppler frequency of carrier waves based on a velocity of the communications apparatus, but also a receiving-electric-field intensity based on a received radio wave. Furthermore, it has a capability of acquiring the transmission environment of the transmission paths by an evaluation based on the calculated two results, i.e., the Doppler frequency and the receiving-electric-field intensity, and data in a bit-error-rate (BER) vs. receiving-electric-field-intensity characteristics model using a carrier frequencies' shift (Doppler frequency) as a parameter.

10 Claims, 9 Drawing Sheets

DIGITAL MOBILE WIRELESS COMMUNICATIONS APPARATUS AND THE SYSTEM USING THE SAME

FIELD OF THE INVENTION

The present invention relates to a digital-mobile-wireless-communications apparatus and the system using the same.

BACKGROUND OF THE INVENTION

Figure 9:
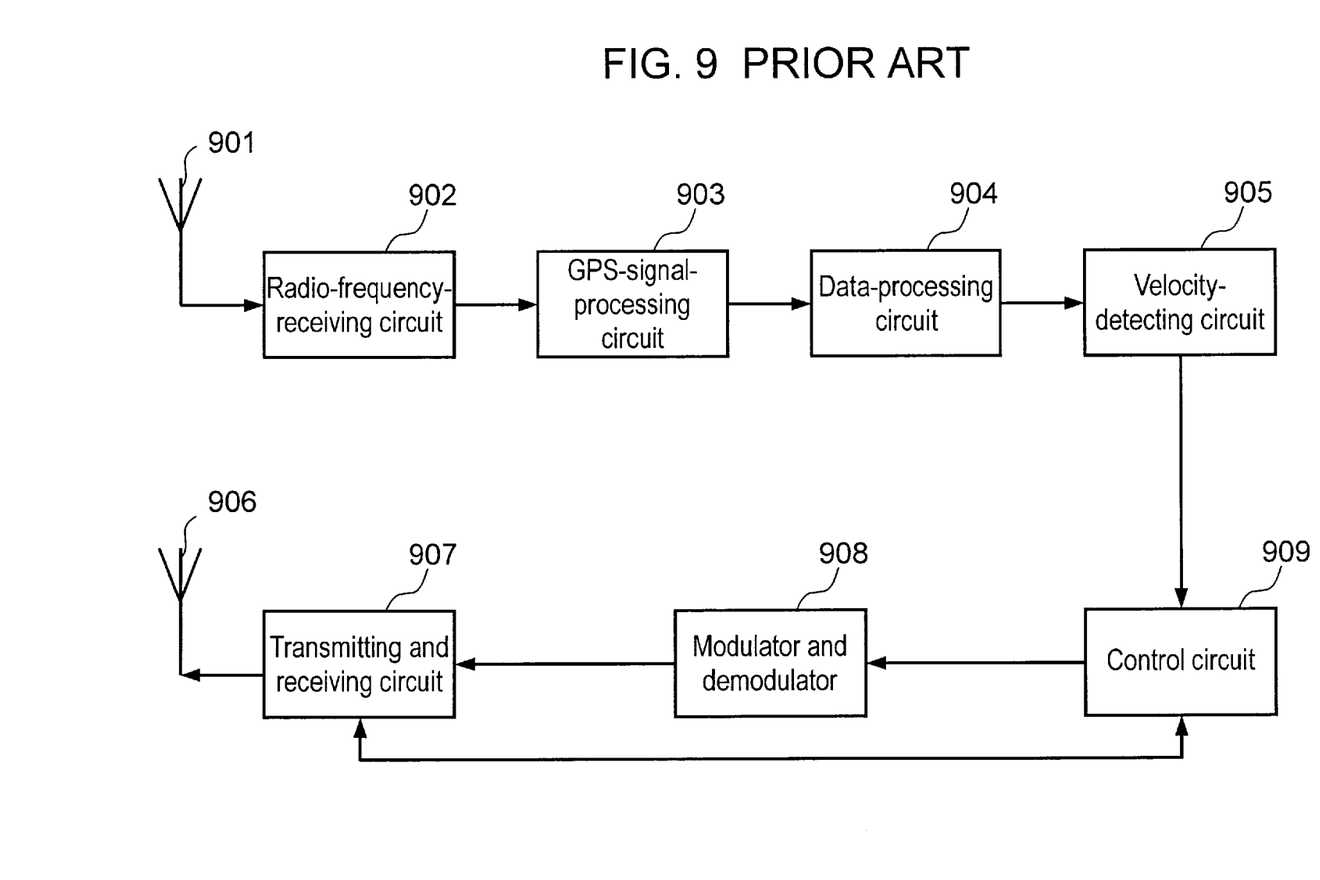
FIG. 9 shows a block diagram of a conventional digital-mobile-wireless-communications apparatus.

In a zone-configured digital-mobile-wireless-phone system, a radio-wave-transmission environment changes every moment caused by a multipath fading. To deal with this problem, a transmission quality has been maintained by changing a zone or a transmission channel as needed while a telephone call is in progress. As the changes of the radio-wave-transmission environment of transmission paths highly depend on the velocity of a mobile phone, the velocity is calculated prior to a changeover, then the changeover is done based on the calculated velocity. For example, in Laid-open Japanese patent H998465, signals transmitted from a plurality of Global Positioning System (GPS) satellites are received by GPS-receiving antenna 901 of mobile phone 900 shown in FIG. 9. The received signal is led into radio-frequency-receiving circuit 902 to demodulate, then fed into GPS-signal-processing circuit 903. Circuit 903 decodes information on GPS-satellite's orbital position and time information from the demodulated signal to output them to data-processing circuit 904. Circuit 904 calculates the current position of mobile phone 900 accurately, and the result is entered to velocity-detecting circuit 905. Circuit 905 calculates the velocity of mobile phone 900 based on the current-position information obtained at intervals over time, and outputs the calculated velocity to control circuit 909. Control circuit 909 sends a control signal, which is determined according to the magnitude of the velocity, to transmitting and receiving circuit 907, and changes a time period that monitors a transmission channel adjacent to the in-use channel (this time period is hereafter referred to as a monitoring period). If a channel whose radio-wave-transmission environment is better than that of the in-use channel is detected, control circuit 909 changes the transmission channel into the detected channel.

In such a conventional way, however, the accurately calculated velocity of a mobile phone has not been exploited fully. This velocity has been previously used for the purpose of changing the monitoring period of the adjacent channel. Specifically, because the detected velocity is not directly related to a physical measure representing a radio-wave-transmission environment of transmission paths, evaluating information on the radio-wave-transmission environment could not be obtained accurately. For example, the calculated velocity of a mobile phone is not related to a degradation of a bit-error-rate (BER), which is caused by a Doppler shift (Doppler frequency) of carrier frequencies for the mobile phone moving at a high speed. Although the way mentioned above is effective at finding a transmission channel having a good-conditioned transmission environment, another problem to be improved lies in the conventional way: the calculated velocity of a mobile phone is not related to a receiving-electric-field intensity of the mobile phone. That is, even if the mobile phone is moving at a high speed under the condition with a sufficient receiving-electric-field intensity, in other words, the condition with a favorable radio-wave-transmission environment, a changeover of the monitoring period is unnecessarily performed as is the case that the radio-wave-transmission environment is in a poor condition. Consequently, the transmission is often subjected to a momentary interruption.

SUMMARY OF THE INVENTION

By making efficient use of information on the velocity and the receiving-electric-field intensity of a mobile phone, it is possible to evaluate the radio-wave-transmission environment with much accuracy. The present invention thus enables to provide a digital-mobile-wireless-communications apparatus with a capability of getting a higher transmission quality.

The communications apparatus of the present invention operates at a receiver as follows:

1) Receiving velocity information for the communications apparatus, a velocity-signal generator converts the velocity information into an electric signal (hereafter referred to as a velocity signal.)

2) Receiving the velocity signal, a Doppler-frequency calculator calculates a Doppler frequency of a radio-wave corresponding to the velocity signal, then converts the Doppler frequency into an electric signal (hereafter referred to as a Doppler-frequency signal.)

3) Detecting a receiving-electric-field intensity at the input section of the communications apparatus, a receiving-electric-field-intensity-signal generator outputs the receiving-electric-field intensity as an electric signal (hereafter referred to as a receiving-electric-field-intensity signal.)

4) Receiving the two signals described above, i.e., the Doppler-frequency signal and the receiving-electric-field-intensity signal as input signals, transmission-environment-inference means evaluates the radio-wave-transmission environment of the communications apparatus based on the entered two signals, then outputs the result as an electric signal (hereafter referred to as a transmission-environment-inference signal.)

For a mobile-wireless-communications apparatus used in a digital communications system, it is generally known that the higher the velocity, the greater the Doppler shift affecting carrier frequencies. This degrades a bit-error-rate (BER), that is, it degrades the transmission quality. The relation between a shift of the carrier frequencies and the influence on the BER by the shift depends on which digital-modulation scheme is used, and the relation is often explained theoretically or experimentally under a radio-wave-transmission environment chosen as a model. Therefore, if the Doppler frequency under a modulation scheme can be calculated, the "most probable" BER corresponding to the Doppler frequency can be also determined by applying data obtained from a radio-wave-transmission environment modeled after a real-world situation. In a like manner, the relation between the receiving-electric-field intensity and its influence on the BER also depends on which digital-modulation scheme is used, and the relation is often explained theoretically or experimentally under a radio-wave-transmission environment chosen as a model. Therefore, if the receiving-electric-field intensity under a modulation scheme can be calculated, the "most probable" BER corresponding to the receiving-electric-field intensity can be also determined by applying data obtained from a radio-wave-transmission environment modeled after a real-world situation. Here, the "most probable" has an implication that the modeled-radio-wave-transmission environment from which the data is obtained is not always fit to the actual radio-wave-transmission environment, in the both cases of the evaluations of the Doppler frequency and the receiving-electric-field intensity.

Therefore, calculating two physical measures, i.e., the Doppler frequency and the receiving-electric-field intensity, the communications apparatus of the present invention can estimate the radio-wave-transmission environment for transmission paths more accurate than before.

Some possible applications for the present invention are described below.

a) The velocity information fed into the velocity-signal generator may include information on a velocity itself of a vehicle or an airplane, or on the satellite position and time information transmitted from GPS satellites.

b) The receiving-electric-field-intensity-signal generator can generate a receiving-electric-field-intensity signal based on an output signal from a Received Signal Strength Indicator (RSSI). The RSSI is arranged to acquire d. c. voltage being proportional to a receiving-electric-field intensity of a received radio wave.

c) Transmission-environment-inference means can be arranged so as to output a transmission-environment-inference signal according to data obtained from a radio-wave-transmission environment model similar to the actual situation under a digital modulation scheme. The data mentioned above is based on a BER vs. receiving-electric-field-intensity characteristics, where the Doppler frequency is used as a parameter.

d) In communications between the communications apparatus and a plurality of base stations in zone-configured mobile communications system, the communications apparatus can change the base station to another to maintain a higher transmission quality, if the radio-wave-transmission environment of the transmission paths currently used is not in a good condition as a consequence of evaluating a signal transmitted from a communications partner.

e) The communications apparatus can provide a communications partner with a transmission-environment-inference signal, by which the communications partner can take measures for getting an improved transmission quality. For example, the communications partner can change a modulation scheme based on the obtained transmission-environment-inference signal.

f) In order to improve the transmission quality and speed, the communications apparatus can change an assigned number of spreading signals if necessary, when the communications apparatus uses a spectrum-spreading communications system.

g) In order to improve the transmission quality, the communications apparatus can adjust a transmitting power level to be an optimal condition, based on the transmission-environment-inference signal transmitted from the communications partner.

According to the present invention, as described above, the Doppler frequency and the receiving-electric-field intensity of the carrier frequencies for the communications apparatus are computed as two physical measures in the apparatus. In consequence of evaluating a relation between these two information items, i.e., the Doppler frequency and the receiving-electric-field intensity and the corresponded BER which has already been obtained from a transmission-environment model similar to an actual situation, a most probable radio-wave-transmission environment of the transmission paths is output. With the output signal, the communications apparatus can:

a) change the base station as a communications partner to another;

b) increase a transmission power;

c) change the modulation scheme of the communications by noting the output signal to the communications partner;

d) change an assigned number of spreading signals per user when the spectrum-spreading-communications system is used.

In this manner, the present invention enables to provide the communications apparatus with a capability of acquiring a higher transmission quality.

DESCRIPTION OF THE PREFERRED EMBODIMENT

The preferred embodiments of a present invention are described hereinafter with reference to the accompanying drawings.

First Preferred Embodiment

Figure 1:
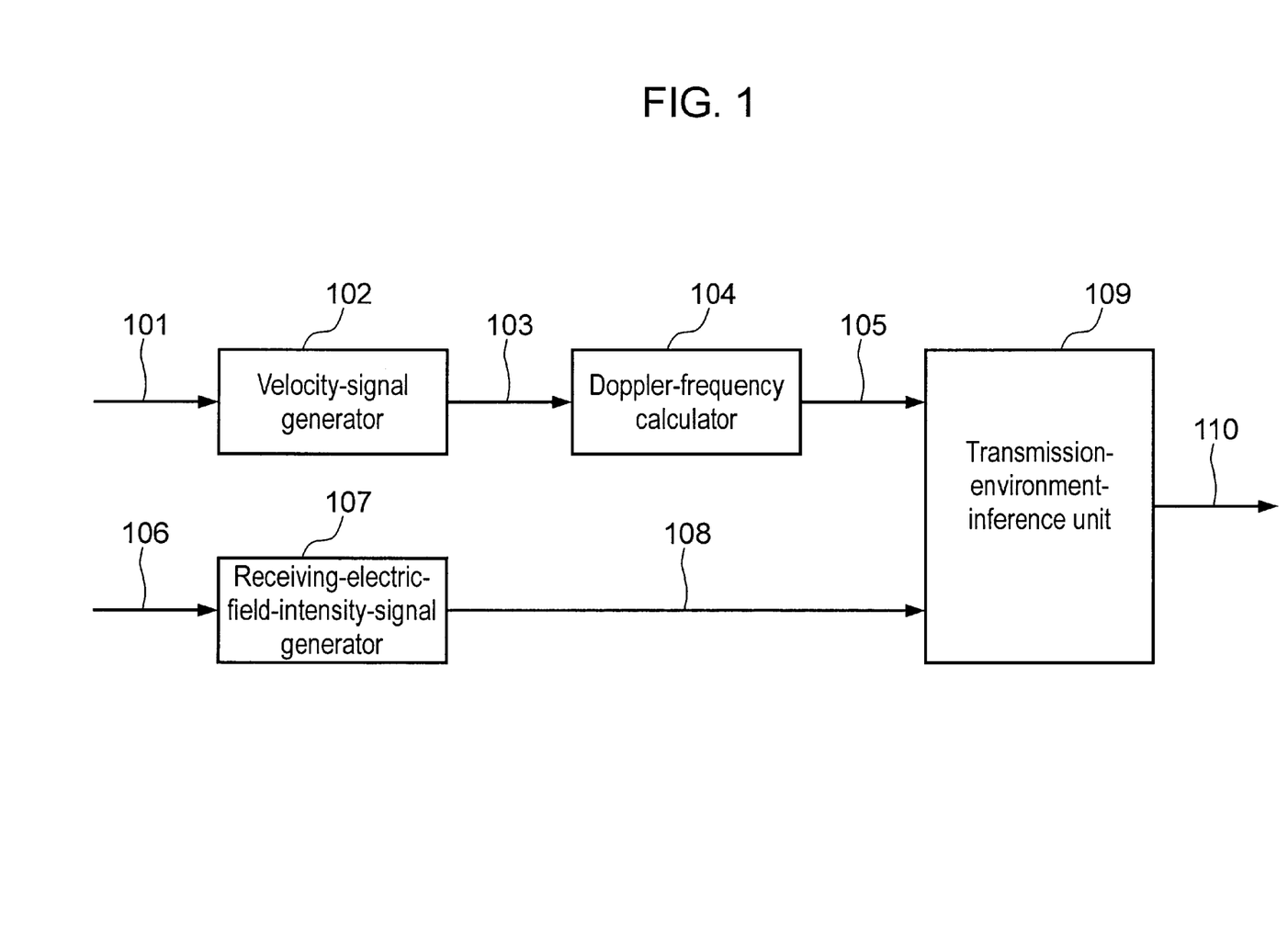
FIG. 1 shows a block diagram of the digital-mobile-wireless-communications apparatus in accordance with a first preferred embodiment of the present invention.
Figure 2:
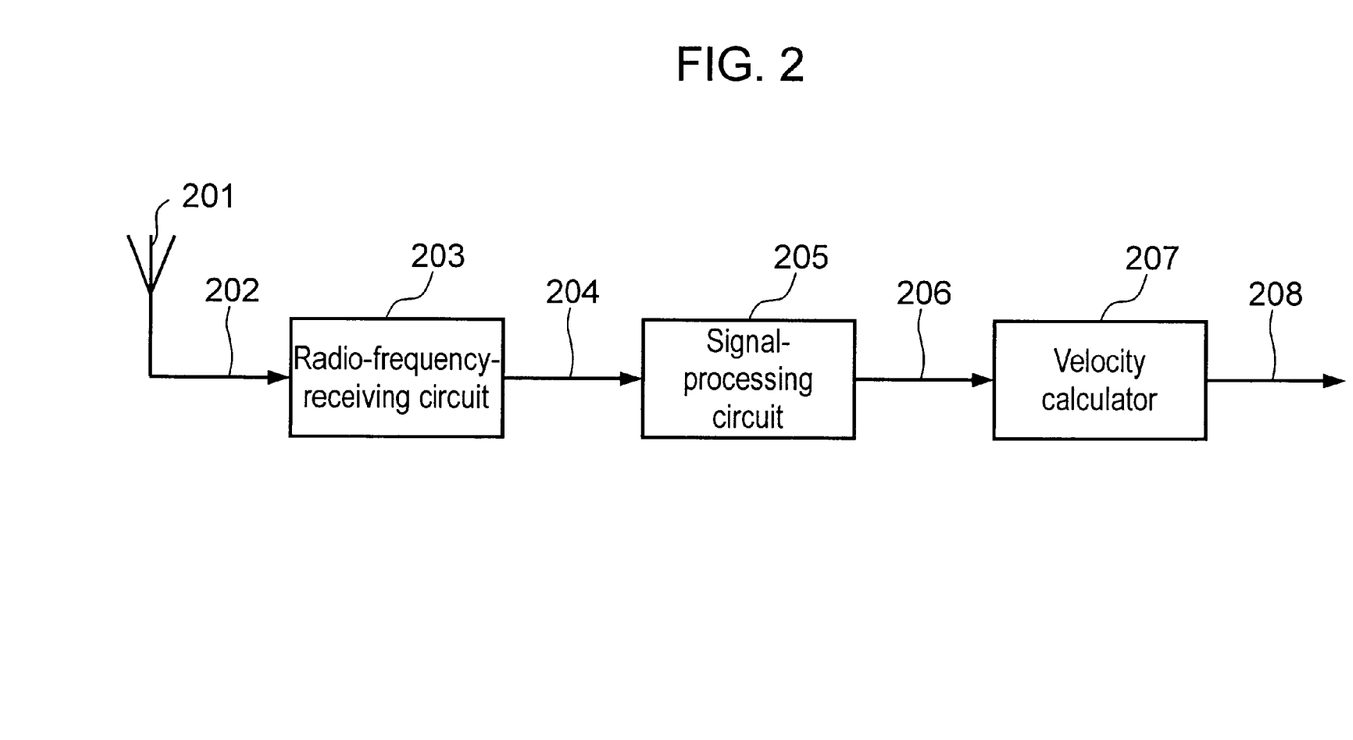
FIG. 2 shows a block diagram of a velocity-signal generator in accordance with the first preferred embodiment of the present invention.
Figure 3:
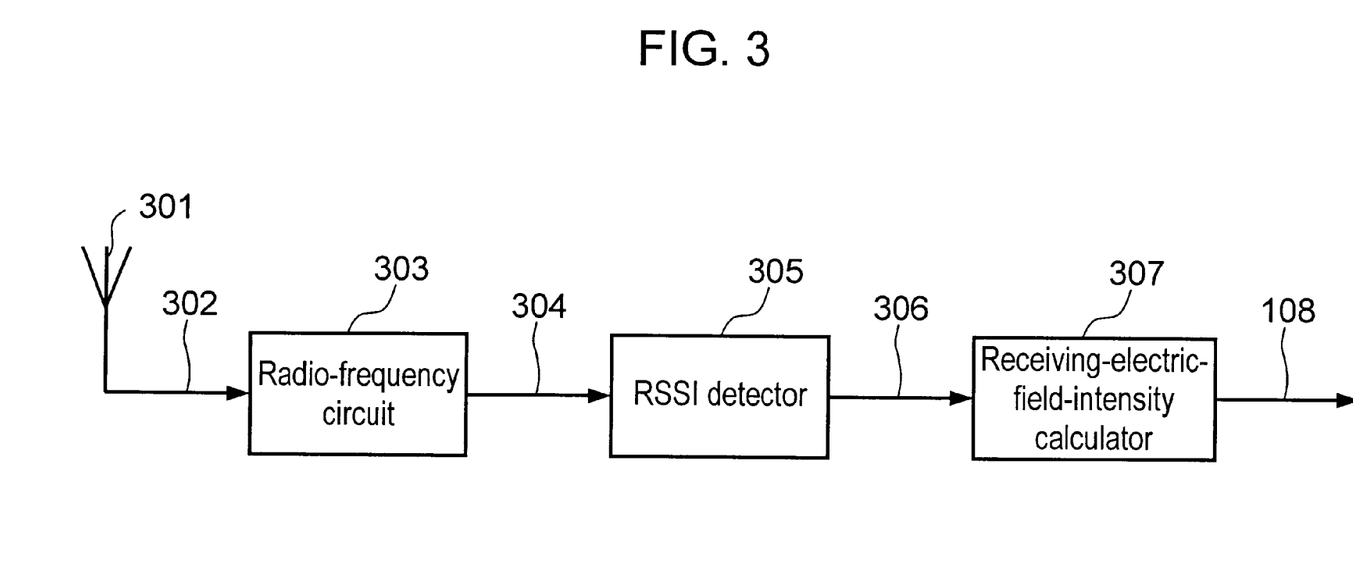
FIG. 3 shows a block diagram of a receiving-electric-field-signal generator in accordance with the first preferred embodiment of the present invention.

FIGS. 1 to 3 are block diagrams of the digital-mobile-wireless-communications apparatus in accordance with a first preferred embodiment of the present invention. FIG. 1 is a general block diagram wherein velocity information 101 and receiving signal 106 are fed into a communications apparatus. FIG. 2 and FIG. 3 are sectional block diagrams, showing detail views of velocity-signal generator 102 and receiving-electric-field-intensity-signal generator 107 in FIG. 1, respectively.

In FIG. 2, a signal transmitted from GPS-satellites is received by GPS-receiving antenna 201 then sent to radiofrequency-receiving circuit 203 for demodulation. Demodulated signal 204 is entered into signal-processing circuit 205. Circuit 205 calculates the current position of a communications apparatus based on information on orbital position and time which are transmitted from three or more GPS-satellites, then the calculated current position is fed into velocity calculator 207. Calculator 207 calculates the velocity of the communications apparatus according to current-position information obtained at intervals over time, and generates velocity signal 103 to output. This signal, which corresponds to velocity signal 103 in FIG. 1, is entered into Doppler-frequency calculator 104. With entered velocity signal 103, calculator 104 calculates a Doppler frequency ($f_d$) of the communications apparatus according to the equation described below. The calculated result, which is output as Doppler-frequency signal 105, is entered into transmission-environment-inference unit 109.

$$f_d = f \cdot v / V$$

where, "f" represents the carrier frequencies for the communications apparatus, "v" represents the velocity of the communications apparatus, and "V" represents a transmission velocity of radio waves.

On the other hand, receiving-electric-field-intensity-signal generator 107 in FIG. 1 comprises antenna 301, radio-frequency circuit 303, RSSI detector 305, and receiving-electric-field-intensity calculator 307 shown in FIG. 3. In FIG. 3, when the communications apparatus and the communications partner are in communication, a radio wave received at antenna 301 is led to radio-frequency circuit 303. After performing amplification and frequency-conversion, circuit 303 generates intermediate-frequency signal 304. RSSI detector 305 detects the signal and outputs d. c. voltage 306. Receiving this d. c. voltage as an input signal, receiving-electric-field-intensity calculator 307 generates receiving-electric-field-intensity signal 108 to output, which is entered into transmission-environment-inference unit 109 shown in FIG. 1. Since radio-frequency circuit 303 and RSSI detector 305 are so designed as to operate in a linear operation region, d. c. voltage 306 is preferably proportional to the receiving-electric-field intensity.

Figure 4:
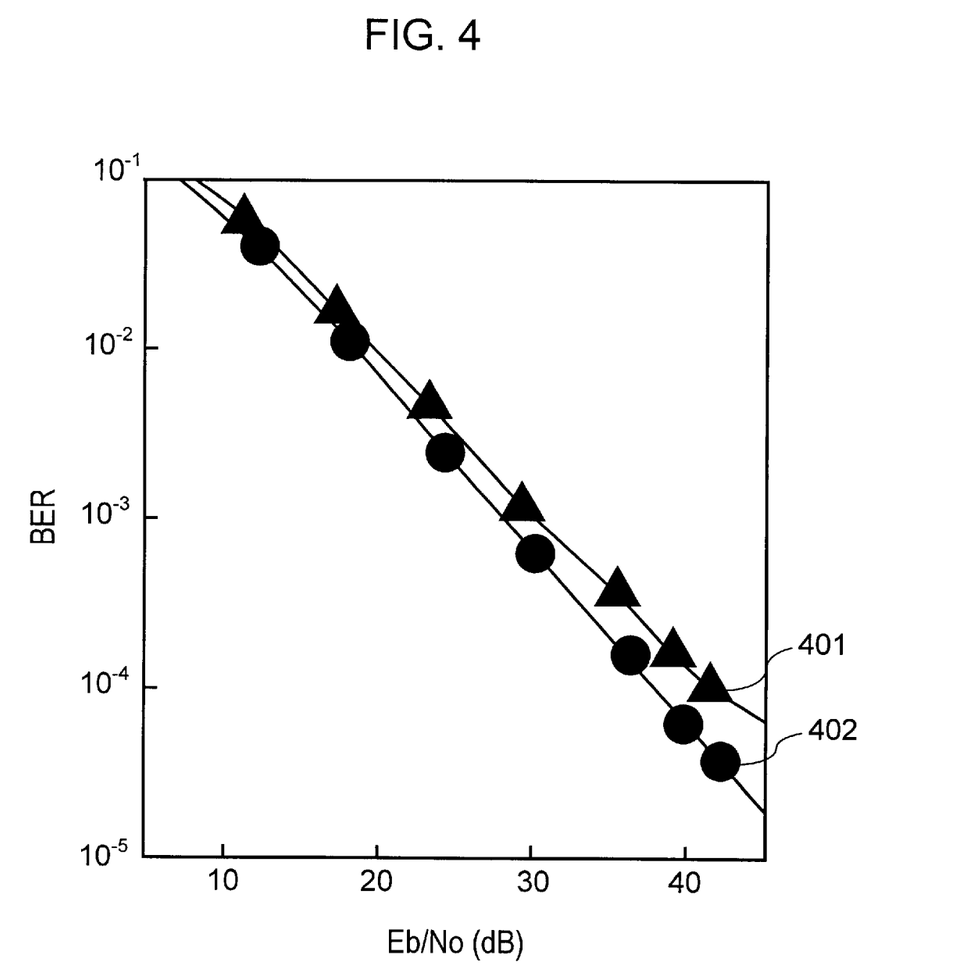
FIG. 4 shows a bit-error-rate (BER) vs. receiving-electric-field-intensity plot under a radio-wave-transmission-environment model in accordance with the first preferred embodiment of the present invention.

As mentioned above, the two signals in FIG. 1, i.e., Doppler-frequency signal 105 and receiving-electric-field-intensity signal 108 are entered into transmission-environment-inference means 109 for signal processing. In the case that a radio wave now-in-use which is subjected to a certain digital-frequency modulation, a bit-error-rate (BER) vs. receiving-electric-field-intensity characteristics using the carrier frequency shift as a parameter shown in FIG. 4 has been obtained experimentally or theoretically, under a transmission-environment model similar to an actual transmission environment. In FIG. 4, curve 401 shows the case of having a larger frequency shift, while curve 402 shows the case of having a smaller frequency shift, where the Doppler frequencies are "fa" and "fb", respectively. It is apparent from FIG. 4 that the larger the frequency shift, the greater the BER. Also, the smaller the receiving-electric-field intensity, the more significant is the difference of curves 401 and 402.

In FIG. 1, transmission-environment inference unit 109:

i) evaluates that Doppler frequency fd is closer to which parameter of fa and fb in FIG. 4, based on entered Doppler-frequency signal 105 in FIG. 1;

ii) calculates Eb/No, the value of the horizontal axis in FIG. 4, based on receiving-electric-field-intensity signal 108 in FIG. 1;

iii) calculates the BER from the point on the curve corresponding to parameter $f_d$ and value Eb/No, and outputs the numerical value as transmission-environment-inference signal 110 in FIG. 1. Where, Eb represents a signal energy per bit, and No represents a noise-power-density.

Through the process above, the transmission-environment-inference signal can be output quantitatively, that is, the transmission environment can be evaluated much more accurate than ever. It is also possible to evaluate the transmission environment by outputting GOOD/BAD evaluating signals in the form of non-numerical values. In this case, two values to be higher and lower thresholds for the BER are set into L1 and L2, respectively. If the computed value mentioned above, namely, the numeral value of transmission-environment-inference signal 110 is larger than L1, the transmission environment is evaluated to be BAD; lies between L1 and L2, the transmission environment is evaluated to be FAIR; and is smaller than L2, the transmission environment is evaluated to be GOOD.

Second Preferred Embodiment

Figure 5A:
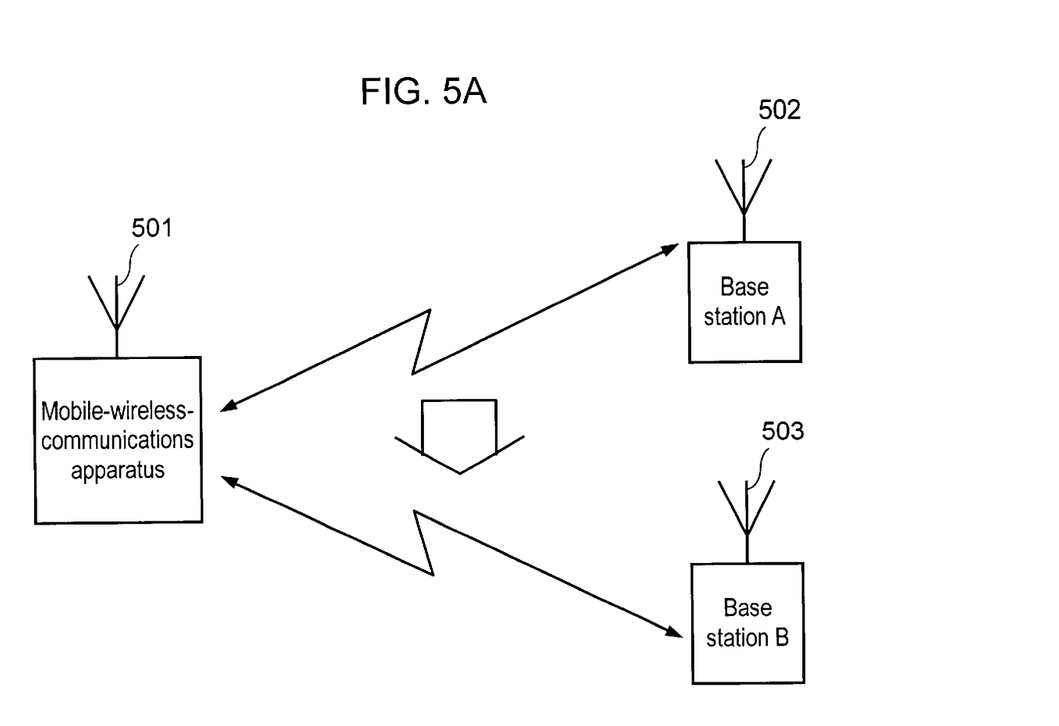
FIG. 5A shows a block diagram of a wireless communications form in accordance with a second preferred embodiment of the present invention.

FIG. 5A shows a mobile-wireless-communications system using a digital-mobile-wireless-communications apparatus in accordance with an exemplary embodiment of the present invention. Digital-mobile-wireless-communications apparatus 501 is the same as that explained in the first preferred embodiment. Suppose that apparatus 501 and base station A 502 are in communication now. If the transmission-environment of the transmission paths is determined to be GOOD by evaluating the transmission-environment-inference signal, the communication with base station A 502 is continued without a changeover, while if BAD is the result from the evaluation, the communication partner is changed from base station A 502 to base station B 503. For evaluating means in this case, as described in the first preferred embodiment, a desired BER is predetermined as a threshold. That is, if the transmission-environment-inference signal of the communications apparatus is equal to or below the threshold level, the transmission environment is evaluated to be GOOD, while if the signal is beyond the threshold level, BAD is the result.

As explained so far, a flexible changeover of the base stations enables to configure the communications system keeping a high transmission quality such that the transmission-environment-inference signal is always beyond a predetermined BER. In this case, the service area which base stations A 502 and B 503 belong to may be the same, or may be different.

Figure 5B:
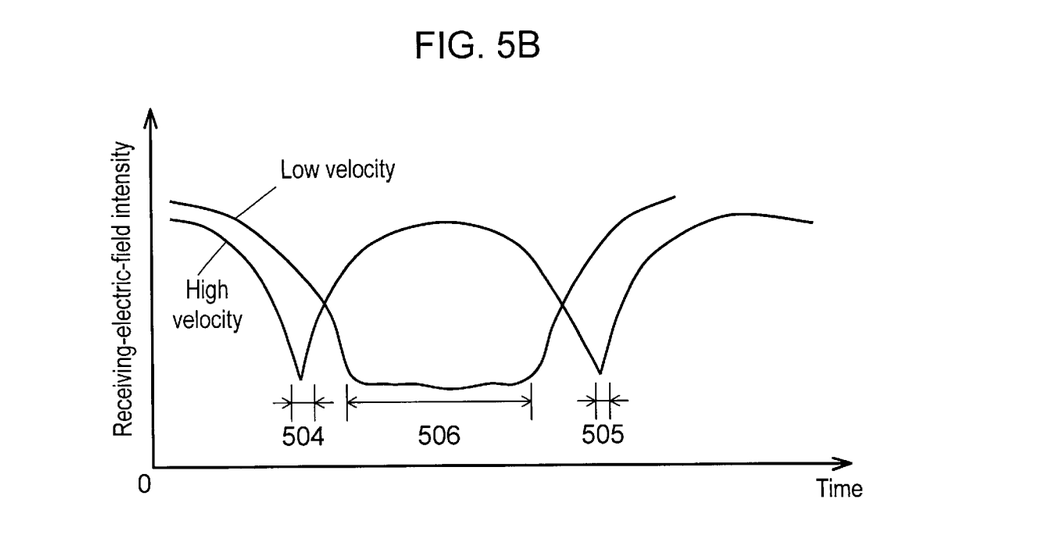
FIG. 5B illustrates the wireless communications form in accordance with the second preferred embodiment of the present invention.

It is also possible to evaluate the transmission environment, not by the transmission-environment-inference signal derived from the BER, but by the transmission-environment-inference signal derived from a fading interval of the receiving-electric-field intensity. That is, a time-axis waveform of receiving-electric-field-intensity signal 108 in FIG. 1 is observed and evaluated over a predetermined period. As shown in FIG. 5B, the fading intervals 504, 505 and 506 of the receiving-electric-field intensity are computed, using the velocity of the communications apparatus as a parameter. Then the transmission-environment-inference signal corresponding to the fading intervals can be generated. In this case, the longer the fading interval, the lower the receiving-electric-field intensity, that is, the transmission environment is determined to be BAD. For example, a threshold level is defined at a receiving-electric-field intensity, and a duration in which the receiving-electric-field intensity is kept below the threshold level is measured. If the duration is longer than a predetermined period of time, the transmission environment is determined to be BAD.

Third Preferred Embodiment

Figure 6:
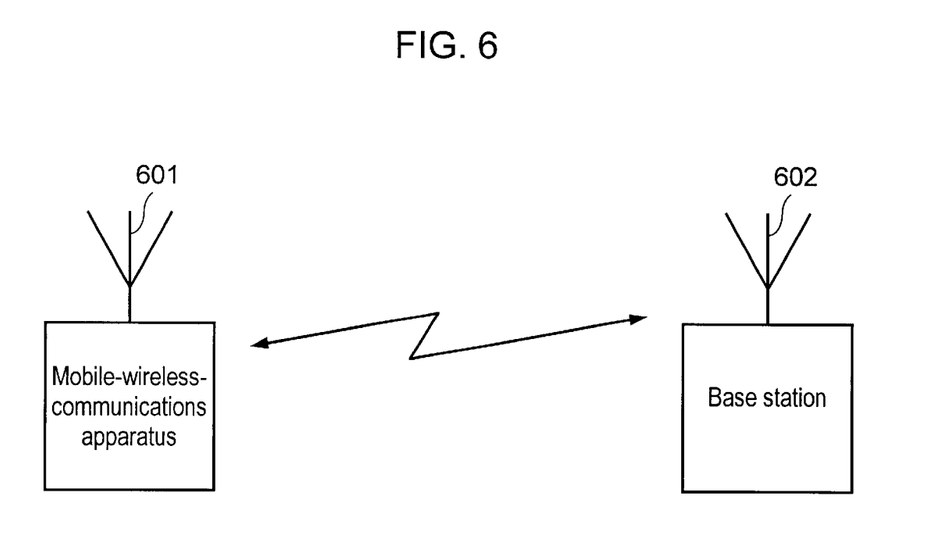
FIG. 6 shows a block diagram of a wireless communcations form in accordance with the second preferred embodiment of the present invention.

FIG. 6 shows another embodiment of the digital-mobile-wireless-communications system using a digital-mobile-wireless-communications apparatus according to the present invention. Digital-mobile-wireless-communications apparatus 601 is the same as that explained in the first preferred embodiment.

Here, suppose that:
a) apparatus 601 and base station 602 are now in communication using a certain digital-modulation system;
b) apparatus 601 outputs a BER as the transmission-environment-inference signal of the transmission paths, and transmits the signal to base station 602, using a radio wave;
c) base station 602 receives the signal in a good condition and evaluates it accurately; and
d) two digital-modulation schemes, namely, a Quadrature-Phase-Shift-Keying (QPSK) scheme and a 16-Quadrature-Amplitude-Modulation (16QAM) scheme can be changed alternately for use in the communications system of the present invention.

Figure 7:
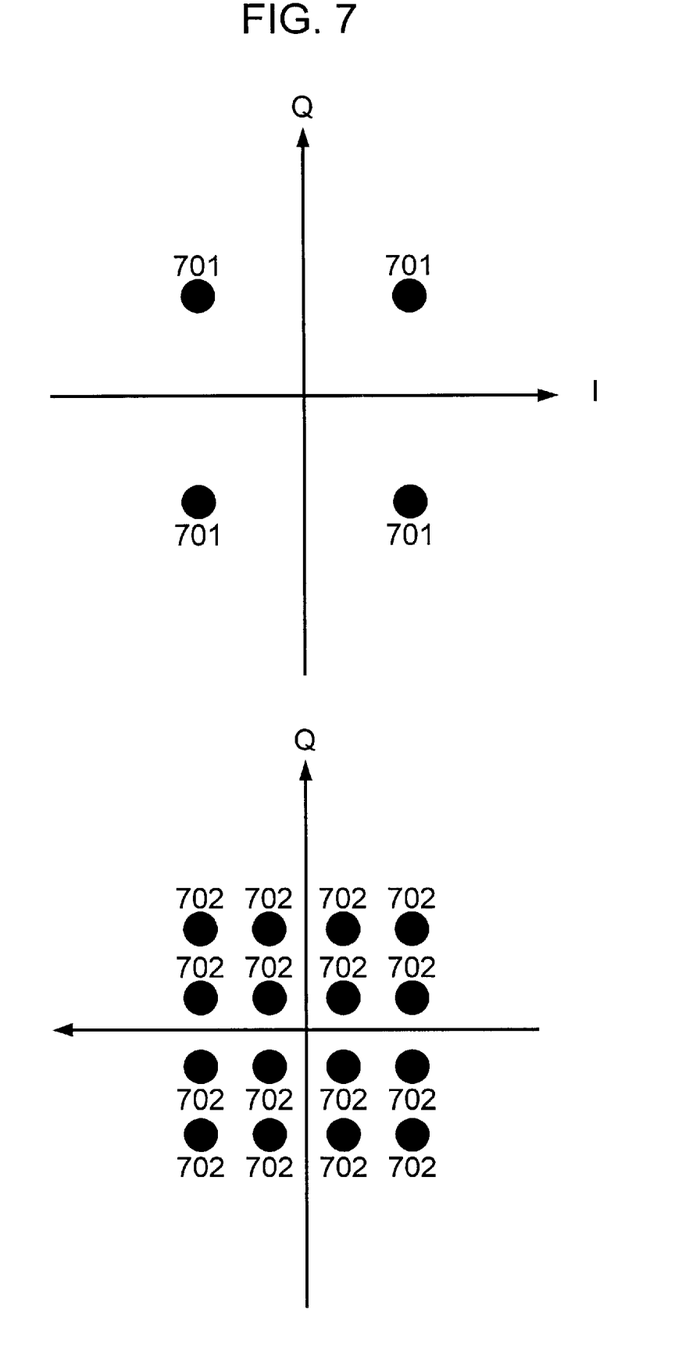
FIG. 7 shows an arrangement of signal points in I-Q (in-phase—quadrature-phase) planes under a Quadrature-Phase-Shift-Keying (QPSK) modulation scheme and a 16-Quadrature-Amplitude-Modulation (16QAM) modulation scheme in accordance with a third preferred embodiment of the present invention.

In these two digital-modulation schemes, it is generally known that QPSK is superior to the other in regard to a withstanding characteristics against bit-errors, while 16QAM is superior to the other in regard to a transmission velocity. As is clear from FIG. 7, QPSK uses a simple identification method with four points having different only phase each other, whereas 16QAM uses a complicated identification method in which 16 points having different phase and amplitude each other have to be identified. Therefore, QPSK can transmit a signal with a lower SNR (signal-to-noise ratio), i.e., can perform a transmission with a higher withstanding characteristics against bit-errors. On the other hand, since the number of the points represents an amount of information which can be carried in each scheme, 16QAM can transmit much more amounts of information, i.e., can make the transmission speed higher.

Suppose that base station 602 determines the transmission environment to be GOOD in consequence of evaluating the transmission-environment-inference signal sent from apparatus 601. In this case, the base station changes the modulation scheme now-in-use to 16QAM for increased transmission speed at a slight penalty in the BER being kept at a sufficient level. On the other hand, in the case that the transmission environment is determined to be BAD, the base station changes the modulation scheme now-in-use to QPSK for getting an improved BER, trading off slightly the transmission speed being kept at a sufficient level. In this manner, an appropriate changeover of the modulation scheme used at the base station according to the transmission-environment-inference signal from the communications apparatus enables to configure a digital-mobile-wireless-communications system having an optimized information quality and transmission speed. Although the communications system in which two types of digital-modulation are used is explained above, it is also applicable to the system using more than two types of digital-modulation schemes.

Figure 8:
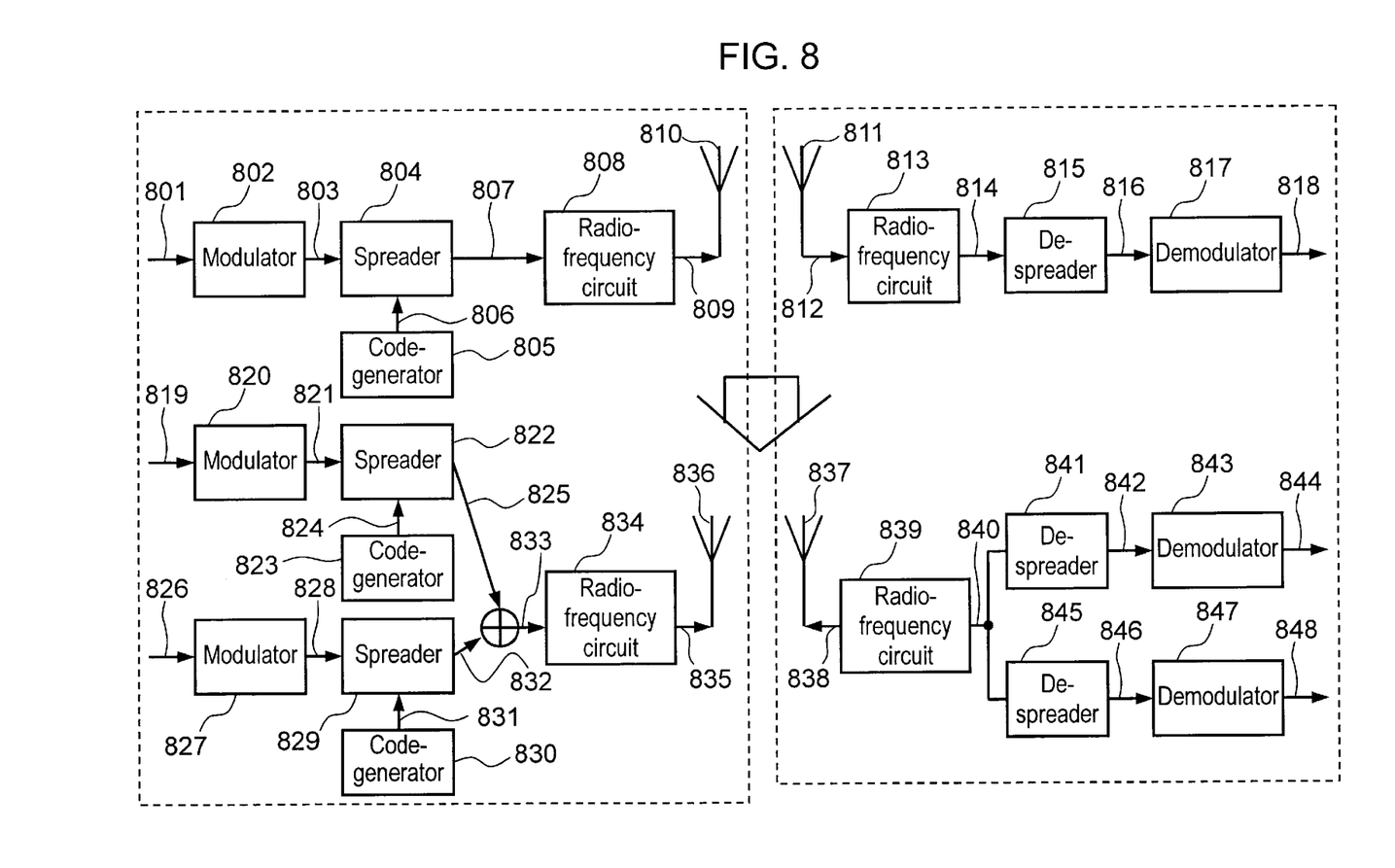
FIG. 8 shows a block diagram of a wireless communications form in the case of changing an assigned number of spreading signals in accordance with the third preferred embodiment of the present invention.

Similarly, how to optimize the transmission quality and speed in the case that the communications system described in the embodiment employs a spectrum-spreading system, referring to FIG. 8, which shows a block diagram of the base station and the communications apparatus.

Suppose that base station 602 determined the transmission environment to be GOOD by evaluating the transmission-environment-inference signal transmitted from the communications apparatus. In a GOOD transmission environment, as mentioned earlier, an amount of information to be transmitted can be increased to get the transmission speed higher, trading off slightly the receiving-electric-field intensity being kept at a sufficient level. In other words, it becomes possible to increase an assigned number of spreading signals per user in the spectrum-spreading system. In a transmitter on the base station's side, as shown in the lower part of the block diagram in FIG. 8, a plurality of modulating signals 819 and 826 are entered into spreaders 822 and 829, respectively. For convenience of the explanation, FIG. 8 shows the case of using two modulating signals. Entered modulating signals 819 and 826 are separately subjected to a spreading spectrum process using two different spreading signals 824 and 831 to be generated spread signals 825 and 832, respectively. Then, these two signals are added by an adder circuit□ and fed out totally as spread signal 833, which is subjected to frequency-conversion at radio-frequency circuit 834 then transmitted via antenna 836. Meanwhile, in the communication apparatus, a signal received at antenna 837 is subjected to frequency-conversion at radio-frequency circuit 839. Frequency-converted signal 840 is branched into each de-spreader 841 and 845, where each signal is separately subjected to a de-spreading process to be generated de-spread signals 842 and 846, respectively. Then, demodulators 843 and 847 demodulate these de-spread signals 842 and 846 to generate desired demodulated signals 844 and 848, respectively. In this way, a higher transmission speed can be obtained by increasing the assigned number of spreading signals and de-spreading signals at the transmitter's side and the receiver's side, respectively.

Contrarily, in the case of a BAD transmission environment, the transmission speed is decreased by decreasing the assigned number of spreading signals in order to get a higher information quality. In this case, in the transmitter on the base station's side, as shown in the upper part of the block diagram in FIG. 8, the number of modulating signals handled in the base station is decreased. For convenience of the explanation, FIG. 8 shows the case that the modulating signal is decreased to one. Modulator 802 outputs the modulated signal 803, further the signal is subjected to the spreading process with spreading signal 806 at spreader 804, resulting that spread spectrum signal 807 is generated. After frequency-conversion at radio-frequency circuit 808, the signal is transmitted from antenna 810. Meanwhile, on the side of the communications apparatus, signal 814, which is received at antenna 811 then subjected to frequency-conversion at radio-frequency circuit 813, is further subjected to the de-spreading process at de-spreader 815. De-spread signal 816, which is generated in consequence of the de-spreading process, is demodulated in demodulator 817, resulting that desired demodulated signal 818 is obtained. As described above, when the transmission environment is BAD, the transmission speed is not expected to be better because the signals handled both at the transmitter's and receiver's sides are decreased in number. Instead, the information quality is greatly improved.

In addition, if the employed mobile-wireless-communications system of the embodiment allows base station 602 to change the transmitting power, the information quality can be improved by controlling the transmitting power with the following way.

When the transmission environment is determined to be GOOD in consequence of the evaluation by base station 602 based on the transmission-environment-inference signal sent from communications apparatus 601, the transmitting power is maintained the current state, or decreased. Contrarily, when the transmission environment is BAD, the transmitting power can be increased to improve the receiving-electric-field intensity, so that the BER always can be kept at an appropriate level.

As explained in three preferred embodiments, the communications apparatus of the present invention calculates not only the Doppler frequency of the carrier waves based on its own velocity, but also the receiving-electric-field intensity based on the received radio wave, in order to represent these two calculated results as physical measures. According to the relation between these two physical measures and the data that is obtained from a transmission-environment model similar to the actual transmission environment, the condition of the current transmission environment of transmission paths is evaluated quantitatively. This allows the communications apparatus itself, or the base station, to optimize the BER and the transmitting speed, resulting in improved transmission quality.

What is claimed is:

1. A digital-mobile-wireless-communications apparatus that moves at a velocity, the receiver of said apparatus comprising:
    a velocity-signal generator that converts information on an entered velocity into an electric signal to and outputs the electric signal as a velocity signal;
    a Doppler-frequency calculator that calculates a Doppler frequency based on the entered velocity and carrier frequencies used for said communications apparatus, and converts the calculated Doppler frequency into an electric signal and outputs the electric signal as a Doppler frequency signal;
    a receiving-electric-field-intensity-signal generator that calculates a receiving-electric-field intensity based on an entered receiving signal, and converts the signal into an electric signal and outputs the electric signal as a receiving-electric-field-intensity signal;
    transmission-environment-inference means that obtains information on a transmission environment by performing an evaluation based on the entered Doppler frequency signal and the receiving-electric-field-intensity signal, then converts the obtained information into an electric signal and outputs the electric signal as a transmission-environment-inference signal; and
    said transmission-environment inference means further for calculating a bit-error-rate associated with said communications signal based on said Doppler frequency signal and said receiving-electric-field-intensity signal.

2. The digital-mobile-wireless-communications apparatus as defined in claim 1, wherein the transmission-environment-inference signal is output based on calculations of bit-error-rate (BER) vs. receiving-electric-field-intensity characteristics, said Doppler frequency obtained from a predetermined transmission-environment model.

3. The digital-mobile-wireless-communications apparatus as defined in claim 1 or claim 2, wherein a communications system which is communicating with said digital-mobile-wireless communications apparatus is modified responsive to said transmission environment indicated as being adverse.

4. The digital-mobile-wireless-communications apparatus as defined in claim 3, wherein the communications system is located in a same service area as said communications apparatus when said communications apparatus is located in a zone-configured service area.

5. The digital-mobile-wireless-communications apparatus as defined in claim 3, wherein the communications system is located in a different service area as said communications apparatus when said communications apparatus is located in a zone-configured service area.

6. A digital-mobile-wireless-communications system comprising the digital-mobile-wireless-communications apparatus as defined in claim 1 or claim 2, wherein said communications apparatus transmits said information regarding the transmission environment to the communications system.

7. The digital-mobile-wireless-communications system as defined in claim 6, wherein said communications apparatus transmits said information regarding the transmission environment to the communications system and wherein a modulation scheme between said communications apparatus and said communications system is changed based on the information.

8. The digital-mobile-wireless-communications system as defined in claim 6, wherein said communications apparatus transmits said information regarding the transmission environment to the communications system and wherein an assigned number of spreading signals between said communications apparatus and said communications system is changed based on said information.

9. The digital-mobile-wireless-communications system as defined in claim 7, wherein said communications apparatus is capable of changing transmitting power between said communications apparatus and said communications system.

10. The digital-mobile-wireless-communications system as defined in claim 8, wherein said communications apparatus is capable of changing transmitting power between said communications apparatus and said communications system.

* * * * *